United States Patent
Spektor et al.

(10) Patent No.: US 9,183,123 B2
(45) Date of Patent: Nov. 10, 2015

(54) PERFORMANCE TESTS IN A CONTINUOUS DEPLOYMENT PIPELINE

(75) Inventors: Adam Spektor, Rehovot (IL); Inbar Shani, Kibutz Beit Kama (IL); Amichai Nitsan, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/419,019

(22) PCT Filed: Aug. 13, 2012

(86) PCT No.: PCT/US2012/050534
§ 371 (c)(1),
(2), (4) Date: Feb. 2, 2015

(87) PCT Pub. No.: WO2014/027990
PCT Pub. Date: Feb. 20, 2014

(65) Prior Publication Data
US 2015/0220426 A1    Aug. 6, 2015

(51) Int. Cl.
*G06F 9/44* (2006.01)
*G06F 11/36* (2006.01)
*G06F 11/34* (2006.01)
*G06F 11/28* (2006.01)

(52) U.S. Cl.
CPC .............. *G06F 11/3692* (2013.01); *G06F 8/71* (2013.01); *G06F 11/28* (2013.01); *G06F 11/3466* (2013.01); *G06F 11/36* (2013.01); *G06F 11/368* (2013.01); *G06F 11/3684* (2013.01)

(58) Field of Classification Search
CPC .............................. G06F 11/3466; G06F 8/71
USPC .................................................. 717/131, 122
See application file for complete search history.

(56) References Cited

U.S. PATENT DOCUMENTS

| 6,701,514 | B1 | 3/2004 | Haswell et al. |
| 8,225,281 | B1* | 7/2012 | Hardinger ........... G06F 11/3664 717/120 |
| 8,677,315 | B1* | 3/2014 | Anderson ................. G06F 8/60 717/101 |
| 2006/0146318 | A1 | 7/2006 | Adam et al. |
| 2007/0250574 | A1* | 10/2007 | Tseitlin ................. G06Q 10/10 709/205 |
| 2008/0270998 | A1 | 10/2008 | Zambrana |
| 2009/0125891 | A1 | 5/2009 | Garimella et al. |

(Continued)

FOREIGN PATENT DOCUMENTS

| KR | 101166128 | 7/2012 |
| KR | 101166128 B1 | 7/2012 |

OTHER PUBLICATIONS

Yadav et al., "Software Testing: Approach to identify Software Bugs", 2012.*

(Continued)

*Primary Examiner* — Phillip H Nguyen
(74) *Attorney, Agent, or Firm* — Hewlett-Packard Patent Department (57) ABSTRACT

A method to perform performance tests on an application in a continuous deployment pipeline is provided herein. The method identifies code changes are two distinct builds in a performance test environment. The method obtains a baseline test result by executing a set of customized test scripts on a baseline build with a first code base. The method similarly tests the new build by executing the set of customized test scripts on the new build with a second code base to obtain a new test result. Performance values are determined by comparing the baseline test result and the new test result.

15 Claims, 6 Drawing Sheets

(56) References Cited

U.S. PATENT DOCUMENTS

| | | | |
|---|---|---|---|
| 2010/0005341 A1 | 1/2010 | Agarwal et al. | |
| 2010/0103839 A1 | 4/2010 | Swenson et al. | |
| 2013/0036237 A1* | 2/2013 | Mutisya | G06F 11/1433 709/238 |
| 2013/0174117 A1* | 7/2013 | Watters | G06F 8/71 717/106 |
| 2013/0174124 A1* | 7/2013 | Watters | G06F 8/71 717/122 |

OTHER PUBLICATIONS

Betteley, J., Continuous Delivery Using Build Pipelines with Jenkins and Ant, May 27, 2011, http://jamesbetteley.wordpress.com/2011/05/27/continuous-delivery-using-build-pipelines-with-jenki-ns-and-ant/.

Duvall, P et al., Automating Infrastructures: Testing, Scripting, Versioning, Continuous, Feb. 5, 2012, http://www.stelligent.com/blog/.

Fowler, M., Continuous Integration, May 1, 2006, http://martinfowler.com/articles/continuousIntegration.html.

Haines, S., Continuous Integration and Performance Testing, Feb. 7, 2008, http://www.drdobbs.com/tools/206105978.

Korean Intellectual Property Office, International Search Report and Written Opinion, Mar. 14, 2012, 11 pages, Daejeon Metropolitan City, Republic of Korea.

Bernd, "Episode 95: The New Guardian.co.uk website with Matt Wall and Erik DoernenBurg," (Podcast), Software Engineering Radio, May 1, 2008, 5 pages, available at http://www.se-radio.net/2008/05/episode-95-the-new-guardian-co-uk-website-with-matt-wall-and-erik-doernenburg/.

Chow, K., "Enterprise Java Performance: Best Practices (2003)," (Web Site), CiteSeerx, copyright 2007-2015, available at http://citeseerx.ist.psu.edu/viewdoc/summary?doi=10.1.1.13.1040.

clarkware.com, "JUnitPerf," copyright 1999-2009, 10 pages, available at http://www.clarkware.com/software/JUnitPerf.html.

Farley, D., "The Deployment Pipeline, (Extending the range of Continuous Integration)," CruiseControl Enterprise, ThoughtWorks, 2007, 11 pages, available at http://continuousdelivery.com/wp-content/uploads/2010/01/The-Deployment-Pipeline-by-Dave-Farley-2007.pdf.

Grabner, A., Eating Our Own Dog Food: How dynaTrace does Continuous APM Internally in Development with dynaTrace TA Lead Stefan Frandl, Jan. 27, 2010, 11 pages, available at http://apmblog.dynatrace.com/2010/01/27/eating-our-own-dog-food-how-dynatrace-does-continuous-apm-internally-in-development-with-dynatrace-ta-lead-stefan-frandl/.

Haines, S., "Continuous Integration and Performance Testing," (Web Site), Dr. Dobb's, Feb. 7, 2008, 6 pages, available at http://www.drdobbs.com/tools/continuous-integration-and-performance-t/206105978.

Humble, J. et al., "Continuous Delivery: Reliable Software Releases Through Build, Test, and Deployment Automation," (Book), Pearson Education, Chapter 9, pp. 225-248, Jul. 2010, available at https://books.google.com/books?hl=en&ir=&id=6ADDuzere-YC&oi=fnd&pg=PT6&ots=usoLNP6r6&sig=QLEd4lXOsfhQ6B9lufMTGsnX9-4#v=onepage&q&f=false.

Humble, J. et al., "The Deployment Production Line," Agile Conference, IEEE, 2006, 6 pages, available at http://continuousdelivery.com/wp-content/uploads/2011/04/deployment_production_line.pdf.

Intel, "Enterprise Java Performance: Best Practices," Intel Technology Journal, Managed Runtime Technologies, Feb. 19, 2003, vol. 7, Issue 1, available at http://citeseerx.ist.psu.edu/viewdoc/download?doi=10.1.1.13.1040&rep=rep1&type=pdf.

Loughran, S., "Making Web Services that Work," Hewlett-Packard Development Company, L.P., Technical Reports, HPL-2002-274, Oct. 23, 2002, Digital Media Systems Laboratory, 57 pages, available at http://www.hpl.hp.com/techreports/2002/HPL-2002-274.html.

MacCaux, M., "Approaches to Performance Testing," Oracle, Sep. 2005, 6 pages, available at http://www.oracle.com/au/products/database/performance-testing-095962.html.

Novakovic, M., "Continuous Performance Mangement," Twitter post, Jax 2006, 2 pages, available at https://twitter.com/mirko_novakovic/status/606400946864816128.

Reitbauer, A., "Performance Management in Continuous Integration," May 4, 2009, 12 pages, available at http://apmblog.dynatrace.com/2009/05/04/performance-management-in-continuous-integration/.

Roper, J., "Bamboo JMeter Aggregator—Getting the most from performance builds," Atlassian Blogs, May 21, 2009, 4 pages, available at http://blogs.atlassian.com/2009/05/bamboo_jmeter_aggregator_getti/.

Siegler, MG, "The Next 6 Months Worth of Features Are in Facebook's Code Right Now (But We Can't See)," (Web Site), Crunch Network, May 30, 2011, 9 pages, available at http://techcrunch.com/2011/05/30/facebook-source-code/.

Sinofsky, S., "Internet Explorer Performance Lab: reliably measuring browser performance," Feb. 16, 2012, 32 pages, available at http://blogs.msdn.com/b/b8/archive/2012/02/16/internet-explorer-performance-lab-reliably-measuring-browser-performance.aspx.

Stackexchange, "Prior art request for WO2014027990 'Performance tests in a continuous deployment pipeline,'" Ask Patents, 8 pages, retrieved online on Aug. 31, 2015 at http://patents.stackexchange.com/questions/12307/prior-art-request-for-wo2014027990-performance-tests-in-a-continuous-deployment%20for%20potential%20prior%20art%20references.

Weinstock-Herman, E., "Continuous Delivery—Adding the Load Testing Stage," LessThanDot, Feb. 17, 2012, 9 pages, available at http://blogs.lessthandot.com/index.php/EnterpriseDev/application-lifecycle-management/continuous-delivery-adding-the-load/.

Weinstock-Herman, E., "Implementing WCAT to Load Test a Website," LessThanDot, Feb. 16, 2012, 10 pages, available at http://blogs.lessthandot.com/index.php/EnterpriseDev/application-lifecycle-management/implementing-wcat-for-load-testing/.

* cited by examiner

PERFORMANCE TESTS IN A CONTINUOUS DEPLOYMENT PIPELINE

BACKGROUND

Software development life cycles use continuous integration (CI) and continuous deployment (CD) to reduce the time code changes spend in a production line. Continuous integration automates the process of receiving code changes from a specific source configuration management (SCM) tool, constructing deliverable assemblies with the code changes, and testing the assemblies.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is illustrated by way of specific examples in which the present disclosure may be practiced. It is to be understood that other examples may be utilized and structural or logical changes may be made without departing from the scope of the present disclosure.

Continuous integration (CI) and continuous deployment (CD) automate the construction, testing, and deployment of code assemblies with a code change. Continuous integration automates the process of retrieving code changes from the SCM tool, constructing deliverable assemblies, such as executing a build and unit testing the assemblies. The automation begins after a code change is committed to a source configuration management (SCM) tool. When the code change is committed to the SCM tool, the code change is assigned to a particular continuous deployment pipeline (CD pipeline or deployment pipeline). The code change moves through the continuous deployment pipeline as the code change is tested as part of a code base or an assembly of code.

Continuous deployment extends continuous integration by automatically deploying the assemblies into a test environment and executing testing on the assemblies. The amount of testing is determined by the continuous deployment pipeline. The tests used for the continuous deployment pipelines are typically static tests assigned based on the classification of the continuous deployment pipeline, such as low priority or high priority. Typical tests include unit tests and application programming interface tests. Load and performance tests are rarely included in the tests due to cost and time constraints since the execution time of performance and load tests are longer than unit tests and application programming interface tests. As a result, the tests lack a quality guarantee since the test sets do not include tests that measure performance of the code changes under testing conditions.

In examples, a method to perform performance tests on an application in a continuous deployment pipeline is provided. The method performs performance tests on an application in a continuous deployment pipeline. The method identifies code changes between a baseline build and a new build. The baseline build and the new build are two distinct builds in a performance test environment. The method obtains a baseline test result by executing a set of customized test scripts on the baseline build. The baseline build includes the first code base that successfully completed the set of performance tests in the continuous deployment pipeline. The method similarly tests the new build by executing the set of customized test scripts on the new build to obtain a new test result. The new build includes the second code base that is being tested in the continuous deployment pipeline. Performance values are determined by comparing the baseline test result and the new test result. The performance values are based on test results that focus on the changes between the baseline build and the new build, which enable easier identification of performance problems.

The phrase "code change" refers to a change in the source code for any software application. The phrase code change may also refer to a code change that is part of a code base constructed as part of a continuous integration process. Examples of code changes include changes or updates to a method, function, line of code, and/or a call to a method or function, such as deletion or addition of a method and/or function.

The phrase "continuous deployment pipeline" or "deployment pipeline" refers to a set of actions executed serially and/or in parallel on a queue of code changes. For example, the continuous deployment pipeline may include building the code, executing unit tests, deploying the code, running automated tests, staging the code, running end-to-end tests, and deploying the code to production. Each continuous deployment pipeline may be classified to receive code changes that match a defined set of criteria, for example, a specific continuous deployment pipeline may be used for low risk and high priority code changes. The test scripts used to test the pipeline may be based on the code changes.

The phrase "test script" refers to the tests run on a continuous deployment pipeline in a simulated environment. The test script tests performance and/or identifies deficiencies in the performance of the application under test (AUT). The test script tests various aspects of application performance with code changes integrated into the build.

The phrase "baseline build" refers to a build of a code base that includes accumulated code changes that have been tested and result in successful execution or completion of testing for performance and/or load. For example, the baseline build includes a first set of code changes which are identified as previous code changes that have been cumulated and incorporated into a code base or first code base. The first code base may include code changes from a previous testing period, such as a previous day's work.

The phrase "new build" refers to a build of a code base that includes the baseline build, i.e., the accumulated code changes that have been test and result in successful execution or completion of testing for performance and/or load, in addition to any changes to the baseline build, such as additions, deletions, and modifications of the code base since the baseline build was tested. For example, the new build includes a second set of code changes. The second set of code changes include changes to the code base or first code base since the previous testing period, such as changes since the previous day's testing.

The phrase "baseline test result" refers to results from the execution of the test scripts on the baseline build.

The phrase "new test result" refers to results from the execution of the test scripts on the new build.

The phrase "performance value" refers to analysis and collection of test results from the execution of test scripts. The performance value may include analysis of a baseline test result and a new test result individually and in aggregate.

Figure 1:
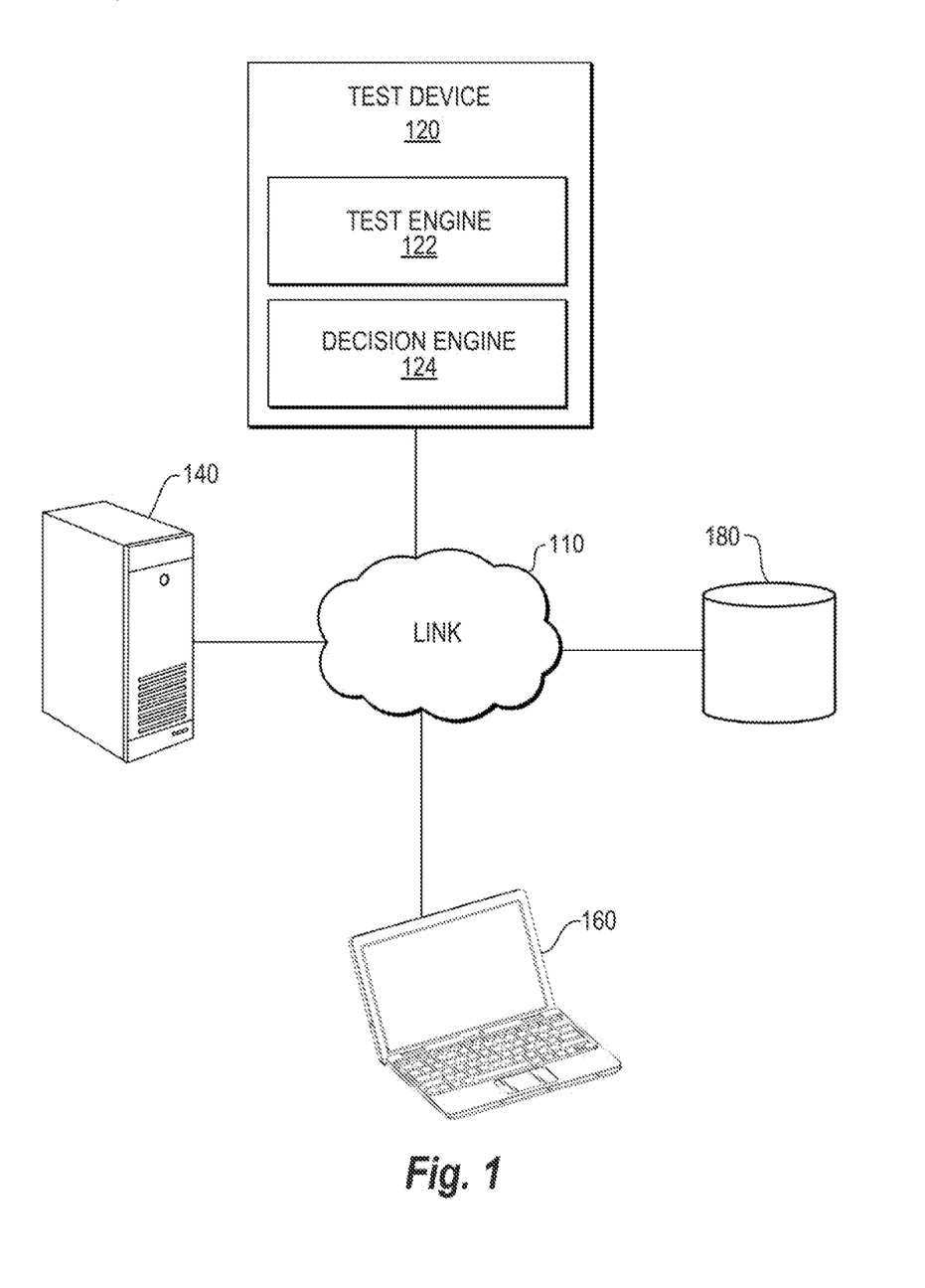
FIG. 1 illustrates a network environment to perform a set of performance tests on an application in a continuous deployment pipeline according to an example.

FIG. 1 illustrates a network environment 100 according to an example. The network environment 100 includes a link 110 that connects a test device 120, a deployment device 140, a client device 160, and a data store 180. The test device 120 represents generally any computing device or combination of computing devices that test code changes from a deployment device 140. The deployment device 140 represents a computing device that receives the code changes and deploys code changes in the continuous deployment pipeline.

The client device 160 represents a computing device and/or a combination of computing devices configured to interact with the test device 120 and the deployment device 140 via the link 110. The interaction may include sending and/or transmitting data on behalf of a user, such as the code change. The interaction may also include receiving data, such as a software application with the code changes. The client device 160 may be, for example, a personal computing device which includes software that enables the user to create and/or edit code for a software application. The client device 160 may further include a user's computing device that runs the application for the user.

The test device 120 represents a computing device and/or a combination of computing devices configured to perform performance tests on an application in a continuous deployment pipeline. The test device 120 is also configured to execute a set of test scripts on the continuous deployment pipeline in an application under test environment to integrate the code changes for use in a software application.

The data store 180 represents generally any memory configured to store data that can be accessed by the test device 120 and the deployment device 140 in the performance of its function. The test device 120 functionalities may be accomplished via the link 110 that connects the test device 120 to the deployment device 140, the client device 160, and the data store 180.

The link 110 represents generally one or more of a cable, wireless, fiber optic, or remote connections via a telecommunication link, an infrared link, a radio frequency link, or any other connectors or systems that provide electronic communication. The link 110 may include, at least in part, an intranet, the Internet, or a combination of both. The link 110 may also include intermediate proxies, routers, switches, load balancers, and the like.

FIG. 1 further illustrates a block diagram of the test device 120 to perform a set of performance tests on an application in a continuous deployment pipeline. The test device 120 includes a test engine 122 and a decision engine 124. The test engine 122 represents generally a combination of hardware and/or programming that execute a set of customized test scripts in the continuous deployment pipeline. The customized test scripts are test scripts automatically generated and defined based on the identification of the code changes between the baseline build and the new build. The decision engine 124 represents generally a combination of hardware and/or programming that identify code changes and determine a performance values based on the results of the set of customized test scripts.

For example, the test engine 122 obtains a baseline test result by executing a set of customized test scripts on a baseline build in a performance test environment. The baseline build including a first code base that successfully completed the set of performance tests in the continuous deployment pipeline. The test engine 122 also executes the set of customized test scripts on a new build in a performance test environment to obtain a new test result. The new build including a second code base being tested in the continuous deployment pipeline.

The decision engine 124 identifies code changes between the baseline build and the new build. The new build and the baseline build are two distinct builds in a performance test environment. The decision engine 124 then determines a performance value by comparing the baseline test result and the new test result.

Figure 2:
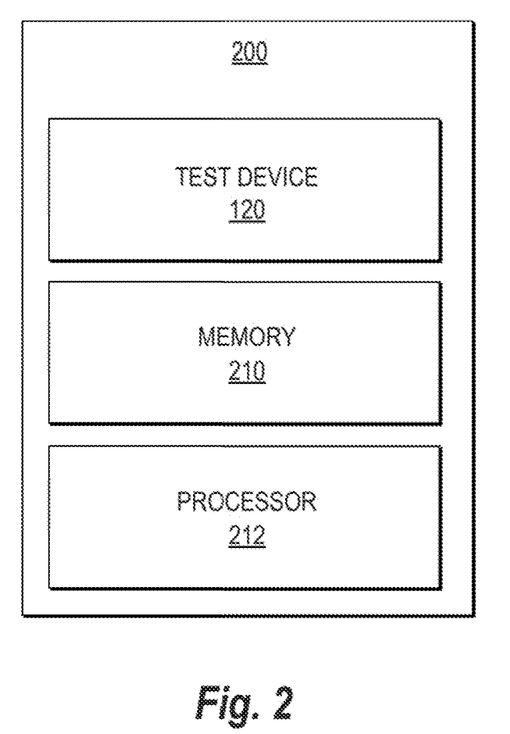
FIG. 2 illustrates a block diagram of an apparatus to perform the set of performance tests on an application in a continuous deployment pipeline according to an example.

FIG. 2 illustrates a block diagram of an apparatus 200 to perform a set of performance tests on an application in a continuous deployment pipeline according to examples. The apparatus 200 is useable with a continuous deployment pipeline and includes the test device 120, a memory 210, and a processor 212. The test device 120 performs the set of performance tests in the continuous deployment pipeline. The memory 210 stores a set of instructions. The processor 212 is coupled to the memory 210 to execute the set of instructions.

The set of instructions identify code changes between a baseline build and a new build. The baseline build and the new build are two distinct builds in a performance test environment. The code changes may be monitored to determine and periodically build a new code base. The monitoring may include instrumentation of the code to include lines of code for monitoring performance and/or load. The monitoring may also include measurement of performance and/or load of specific line(s) of code changed over a predefined period, such between daily builds.

The set of instructions obtain a baseline test result by executing a set of customized test scripts on a baseline build in a performance test environment. The baseline build includes the first code base that the set of performance tests were successfully completed in the continuous deployment pipeline. The baseline build may be obtained from a data store 180, such as a build repository that stores daily builds.

The set of instructions also execute the set of customized test scripts on a new build in a performance test environment to obtain a new test result. The new build includes the second code base being tested in the continuous deployment pipeline. The set of customized test scripts may be serially or simultaneously executed on the baseline build and the new build. The set of instructions may further generate a load on a client device and/or server using the set of customized test scripts and/or additional testing conditions.

The set of instructions determine a performance value by comparing the baseline test result and the new test result. The determination of the performance value may include analyzing the baseline test result and the new test result for at least one of a performance trend and a performance problem. The determination of the performance value may also include correlating the performance value to a specific portion of the second code base, such as a line of code and/or a function. The performance value may be provided as a performance report via email and/or published via communication channels. The performance value may also be stored in a data store 180, such as a test result repository that stores the daily test results and stores the data for current and previous test results therein.

Figure 3:
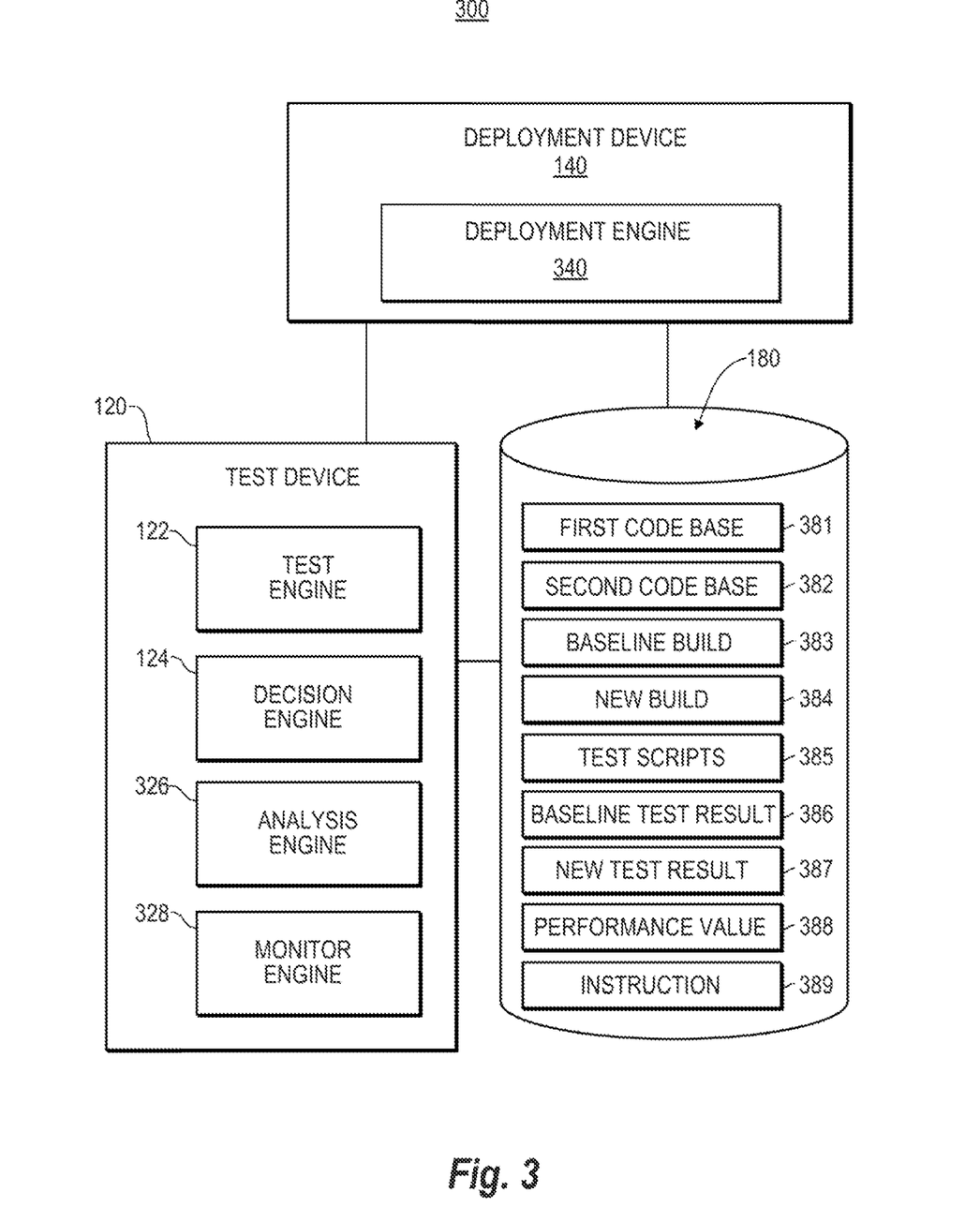
FIG. 3 illustrates block diagram of a system useable with the network environment of FIG. 1 according to an example.

FIG. 3 illustrates a block diagram of a system 300 useable with the environment 100 of FIG. 1 according to an example. The system 300 includes the test device 120, the deployment device 140 and the data store 180. As illustrated in FIG. 1, the test device 120, the deployment device 140, and the data store 180 are connected via the link 110.

The data store 180 may store data accessible by the test device 120 and/or the deployment device 140. The data store 180 is, for example, a database that stores at least one of the following a first code base 381, a second code base 382, a baseline build 383, a new build 384, a set of customized test scripts 385, a baseline test result 386, a new test result 387, a performance value 388, such as daily test results, and an instruction 389, such as an instruction to be performed by a processor 212.

The test device 120 performs the set of performance tests on an application in a continuous deployment pipeline. The test device 120 is connected to the deployment device 140, which receives the first and second code bases 381, 382 from the client device 160 (illustrated in FIG. 1). The test device 120 is illustrated as including a test engine 122 and a decision engine 124.

The test engine 122 represents generally a combination of hardware and/or programming to obtain a baseline test result 386 by executing a set of customized test scripts 385 on a baseline build 383 in a performance test environment. The baseline build 383 includes a first code base 381 that successfully completed the set of performance tests in the continuous deployment pipeline. The test engine 122 also executes the set of customized test scripts 385 on a new build 384 in a performance test environment to obtain a new test result 387. The new build 384 includes a second code base 382 being tested in the continuous deployment pipeline. The test engine 122 may receive an instruction and/or the set of customized test scripts 385 from the decision engine 124 and/or the data store 180.

The decision engine 124 represents generally a combination of hardware and/or programming to identify code changes between the first code base 381 and the second code base 382. The first code base 381 and the second code base 382 are two distinct builds in a performance test environment. For example, the decision engine 124 or a separate monitor engine 328 may monitor a set of code changes and build a new code base based on the set of code changes received during the monitoring. The monitoring may include instrumentation of the code to include lines of code that monitor performance and/or load. The monitoring may also include measurement of performance of specific line(s) of code changed over a predefined period, such as monitoring performance and/or load of code changes on a daily basis.

The decision engine 124 then determines a performance value 388 by comparing the baseline test result 386 and the new test result 387. The performance value 388 that includes measuring and analyzing results for each of the baseline build 383 and the new build 384. The performance value 388 includes at least one of: a system performance value corresponding to performance of a client device; a server code change performance value corresponding to performance of at least one of the first code base 381 and the second code base 382 on a server device; and a client code change performance value corresponding to performance of at least one of the first code base 381 and the second code base 382 on a client device. The decision engine 124 and/or a separate analysis engine 326 may analyze the performance values 388. For example, at least one of the following analyses may be performed: analyze the baseline test result 386 and the new test result 387 for at least one of a performance trend and a performance problem; correlate the performance value 388 to a specific code change, line of code, and/or function; and generate a performance report to identify the performance values 388 for diagnosis, history, and/or reporting purposes.

The deployment device 140 includes a deployment engine 340. The deployment engine 340 represents generally a combination of hardware and/or programming that deploys a code base after the code base successfully completes a set of tests in a test environment. The deployment device 140 deploys the code base via a deployment engine 340. The deployment engine 340 may work together with the test engine 122 and the decision engine 124 to execute the set of customized test scripts 385. Moreover, the deployment engine 340 controls a continuous deployment pipeline after the code base passes the set of customized test scripts 385.

Figure 4:
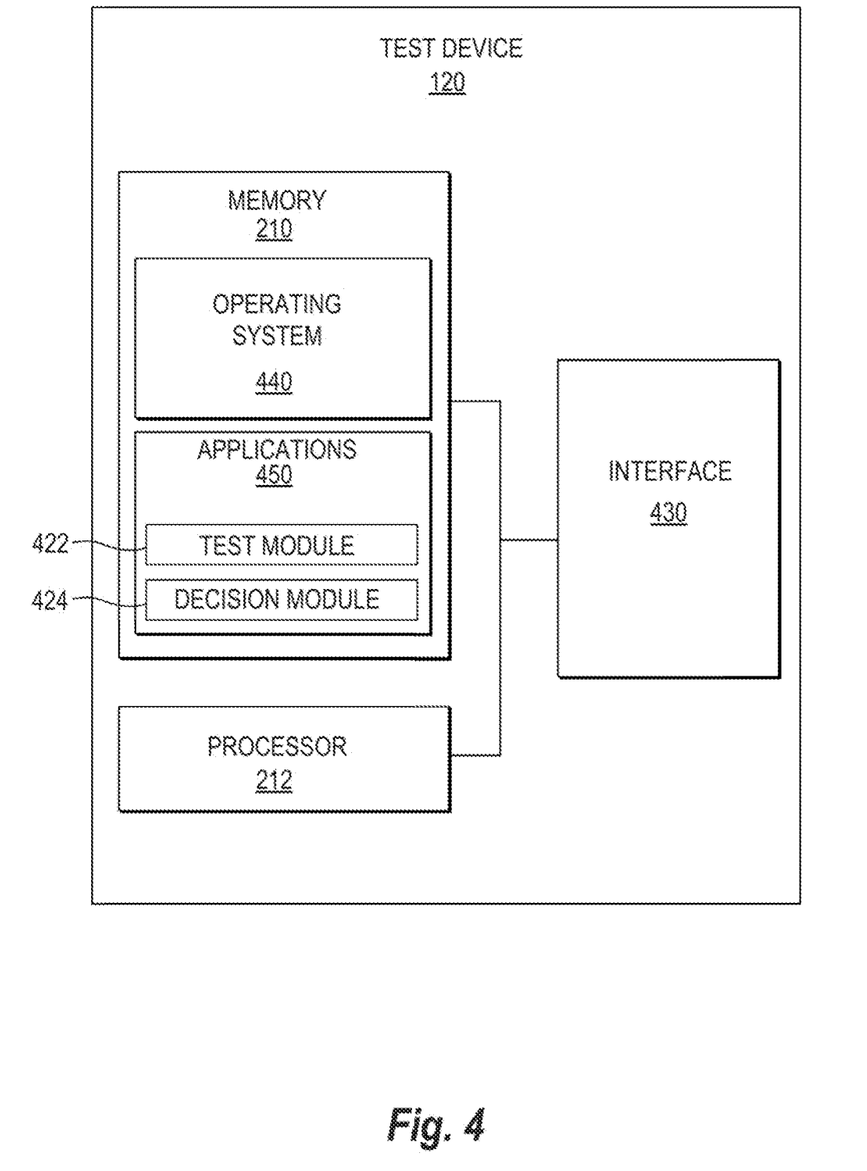
FIG. 4 illustrates a block diagram of a computer readable medium useable with the apparatus of FIG. 2, according to an example.

FIG. 4 illustrates a block diagram of a computer readable medium useable with the apparatus 200 of FIG. 2 according to an example. In FIG. 4, the test device 120 is illustrated to include a memory 210, a processor 212, and an interface 430. The processor 212 represents generally any processor configured to execute program instructions stored in memory 210 to perform various specified functions. The interface 430 represents generally any interface enabling the test device 120 to communicate with the deployment device 140 via the link 110, as illustrated in FIGS. 1 and 3.

The memory 210 is illustrated to include an operating system 440 and applications 450. The operating system 440 represents a collection of programs that when executed by the processor 212 serve as a platform on which applications 450 may run. Examples of operating systems 440 include various versions of Microsoft's Windows® and Linux®. Applications 450 represent program instructions that when executed by the processor 212 function as an application that perform a set of performance tests on an application in a continuous deployment pipeline. For example, FIG. 4 illustrates a test module 422 and a decision module 424 as executable program instructions stored in memory 210 of the test device 120.

Referring back to FIGS. 1-3, the test engine 122 and the decision engine 124 of the test device 120 are described as combinations of hardware and/or programming. As illustrated in FIG. 4, the hardware portions may include the processor 212. The programming portions may include the operating system 440, applications 450, and/or combinations thereof. For example, the test module 422 represents program instructions that when executed by a processor 212 cause the implementation of the of the test engine 122 of FIGS. 1 and 3. The decision module 424 represents program instructions that when executed by a processor 212 cause the implementation of the of the decision engine 124 of FIGS. 1 and 3. Similarly, the functions of the analysis engine 326 and the monitor engine 328 may be performed by the test module 422 and/or the decision module 424 or by additional module(s) (not shown).

The programming of the test module 422 and decision module 424 may be processor executable instructions stored on a memory 210 that includes a tangible memory media and the hardware may include a processor 212 to execute the instructions, e.g., instruction 389. The memory 210 may store program instructions that when executed by the processor 212 cause the processor 212 to perform the program instructions. The memory 210 may be integrated in the same device as the processor 212 or it may be separate but accessible to that device and processor 212.

In some examples, the program instructions may be part of an installation package that can be executed by the processor 212 to perform a method using the system 300. The memory 210 may be a portable medium such as a CD, DVD, or flash drive or a memory maintained by a server from which the installation package can be downloaded and installed. In some examples, the program instructions may be part of an application or applications already installed on the server. In further examples, the memory 210 may include integrated memory, such as a hard drive.

Figure 5:
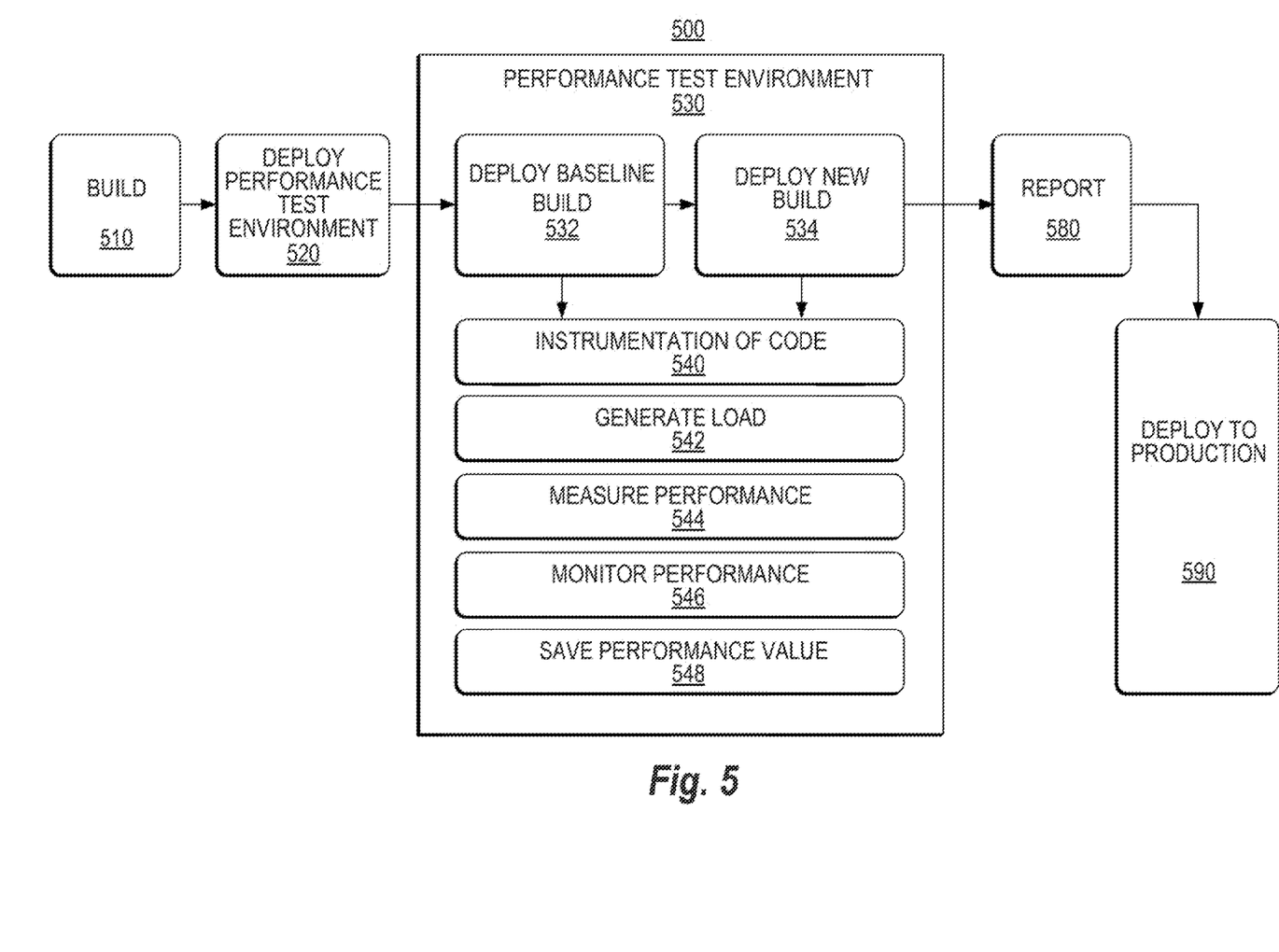
FIG. 5 illustrates a schematic diagram of a process that performs the set of performance tests on an application in a continuous deployment pipeline according to an example.

FIG. 5 illustrates a schematic diagram 500 of the process that performs a set of performance tests on an application according to an example. Referring to FIG. 5, a build of a code base is executed at block 510. The build may execute unit testing to ensure the quality of the build and/or code instrumentation where required for code compilation. The performance test environment is deployed in block 520. The deployment may be incrementally upon an existing deployment with adjustments for the current continuous deployment pipeline monitoring requirements, as determined by the code changes in the continuous deployment pipeline.

Block 530 illustrates the performance test environment. In the performance test environment, the previous build or baseline build 383 is deployed in block 532 and the current build or new build 384 is deployed in block 534. The baseline build 383 is the last good build before the accumulated changes are deployed. The baseline build 383 is typically stored after successfully completed the set of performance tests, i.e., successful completion of the previous execution of the load and performance testing in the continuous deployment pipeline. For example, the baseline build 383 may include changes from the previous day if the performance test is run on a daily basis. The new build 384 includes accumulated changes over a defined period, such as daily. The baseline build 383 and the new build 384 may be deployed simultaneously using separate test devices run on the same performance test environment conditions and/or in series. The performance test environment may need to be re-provisioned between the tests when run in series.

In the performance test environment, the baseline build 383 and the new build 384 each undergo load and performance testing individually, using for example, the same customized test scripts 385 on each build to enable accurate comparisons therebetween. The load and performance tests include instrumentation of the code in block 540 to add code that monitors performance and load. The instrumentation occurs at this point if the instrumentation did not occur prior to this step. The customized test scripts 385 are executed in block 542. The customized test scripts 385 include code to add load and/or stress to the system under test. The load and/or stress may be added using, for example a load generator. The customized test scripts 385 also measure performance in block 544. The measurement of performance includes performance from the client device and/or the server. The customized test scripts 385 also monitor performance of the code base or application on the client device and the server in block 546. The customized test scripts 385 then save the performance values 388 for each of the builds in block 548.

The performance values 388 of blocks 540, 542, 544, 546 and 548 for the baseline build 383 and the new build 384 are compared and analyzed. The performance testing and results therefrom focus on changes between the code bases, i.e., the first code base 381 and the second code base 382, and the customized test scripts 385 are customized based on the changes to the code and performance and/or load tests needed to test the changes to the code. For example, the customized test scripts 385 will test function calls in the code base that are added, removed, and/or modified between the baseline build 383 and the new build 384. The analysis may be automatic and include performance trends and performance problems. Specific performance problems can be correlated to a specific portion of a code change and automatically assigned to a person and/or a team, such as a code change committer.

The performance values 388 are then reported in block 580. The reporting may include distribution via push channels, such as email and/or publish channels, such as a continuous delivery dashboard. Depending on the performance values 388, the new build 384 with the second code base 382 is deployed to production in block 590. For example, the new build 384 is only deployed after the performance value 388 includes that the performance testing was successful.

Figure 6:
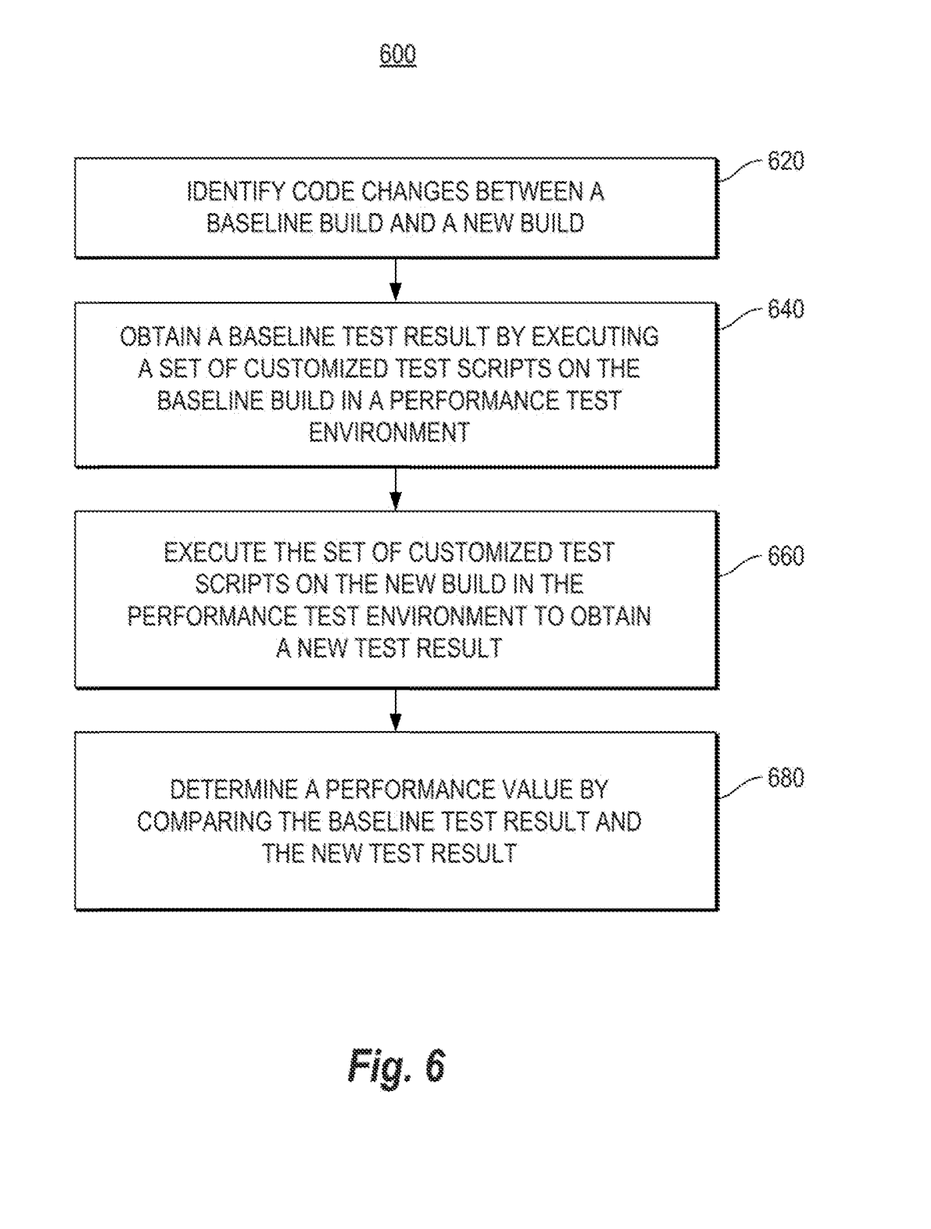
FIG. 6 illustrates a flow chart of methods to perform the set of performance tests on an application in a continuous deployment pipeline according to examples.

FIG. 6 illustrates a flow diagram 600 of a method, such as a processor implemented method, to perform a set of performance tests on an application in a continuous deployment pipeline. The set of performance tests may generate a load on a client device and/or server. In block 620, code changes between a baseline build and a new build are identified. The code changes may be identified with a decision engine. The baseline build and the new build are two distinct builds in a performance test environment. For example, the code changes may be monitored to determine and periodically build a new code base based on the set of code changes received during the monitoring. The monitoring may include instrumentation of the code to include lines of code for monitoring performance and/or load. The monitoring may also include measurement of performance and/or load of specific line(s) of code changed over a predefined period, such as a daily period of time.

A baseline test result is obtained in block 640. The baseline build includes the first code base that successfully completed the set of performance tests in the continuous deployment pipeline. The baseline test result may be obtained in a test engine by executing a set of customized test scripts on the baseline build in a performance test environment. The baseline build may be stored in a build repository that stores daily builds and/or a history of builds. The daily builds may be accessible thereafter to use for comparison in performance tests.

In block 660, the set of customized test scripts are executed a new build in a performance test environment to obtain a new test result. The new build is tested with the test engine. The new build includes the second code base being tested in the continuous deployment pipeline. The set of customized test scripts may be executed on the baseline build and the new build serially or simultaneously. A performance test environment in the continuous deployment pipeline is deployed to execute the set of customized test scripts. The performance test environment and/or the set of customized test scripts may generate a load on a client device and/or server. The set of customized test scripts test the code changes based on the code change received instead of an entire assembly of code for an application.

A performance value is determined in block 680 by comparing the baseline test result and the new test result. A decision engine may determine the performance value based on the baseline test result and the new test result. For example, the performance value comprises at least one of: a system performance value corresponding to performance of a client device; a server code change performance value corresponding to performance of at least one of the first code base and the second code base on a server device; and a client code change performance value corresponding to performance of at least one of the first code base and the second code base on a client device.

The performance values may be analyzed and/or used for a variety of purposes. For example, the determination of the performance value may further include analysis of the baseline test result and the new test result for at least one of a performance trend and a performance problem. The performance value may also be correlated to a specific portion of the second code base. The performance value and any associated data and analysis may also be provided as a performance report that is distributed via, for example, email, or published via, for example communication channels. The performance values and any associated data and analysis may be stored in, for example a test result repository, such as a data store that stores the daily test results.

FIGS. 1-6 aid in illustrating the architecture, functionality, and operation according to examples. The examples illustrate various physical and logical components. The various components illustrated are defined at least in part as programs, programming, or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Examples can be realized in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 6 illustrates specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A processor implemented method to perform a set of performance tests on an application in a continuous deployment pipeline, the method comprising:
   identifying, with a decision engine executed by a processor, a set of code changes between a baseline build and a new build, the baseline build and the new build being two distinct builds in a performance test environment;
   obtaining, with a test engine executed by the processor, a baseline test result by executing a set of customized test scripts on the baseline build in the performance test environment, the baseline build including a first code base that successfully completed the set of performance tests in the continuous deployment pipeline;
   testing, with the test engine executed by the processor, the new build by executing the set of customized test scripts on the new build in the performance test environment to obtain a new test result, the new build including a second code base being tested in the continuous deployment pipeline; and
   determining, with a decision engine executed by the processor, a performance value by comparing the baseline test result and the new test result.

2. The method of claim 1, wherein the performance value comprises at least one of:
   analyzing a system performance value for each of the baseline build and the new build, the system performance value corresponding to performance of a client device;
   analyzing a server code change performance value for each of the baseline build and the new build, the server code change performance value corresponding to performance of at least one of the first code base and the second code base on a server device; and
   analyzing a client device code change performance value for each of the baseline build and the new build, the client device code change performance value corresponding to performance of at least one of the first code base and the second code base on a client device.

3. The method of claim 1, further comprising simultaneously executing the set of customized test scripts on the baseline build and the new build.

4. The method of claim 1, further comprising monitoring the set of code changes to determine and periodically build a new code base based on the set of code changes received.

5. The method of claim 1, wherein determining the performance value comprises analyzing the baseline test result and the new test result for at least one of a performance trend and a performance problem.

6. The method of claim 1, wherein determining the performance value comprises correlating the performance value to a specific code change between the first code base and the second code base.

7. The method of claim 1, further comprising providing the performance value as a performance report.

8. The method of claim 1, further comprising obtaining the baseline build from a build repository.

9. The method of claim 1, further comprising storing the performance value in a test result repository.

10. The method of claim 1, further comprising generating a load on at least one of a client device and a server.

11. A system to perform a set of performance tests on an application in a continuous deployment pipeline, the system comprising:
   a processor configured to execute:
      a test engine to:
         obtain a baseline test result by executing a set of customized test scripts on a baseline build in a performance test environment, the baseline build including a first code base that successfully completed the set of performance tests in the continuous deployment pipeline; and
         execute the set of customized test scripts on a new build in the performance test environment to obtain a new test result, the new build including a second code base being tested in the continuous deployment pipeline; and
      a decision engine to:
         identify a set of code changes between the baseline build and the new build, the baseline build and the new build being two distinct builds in the performance test environment; and
         determine a performance value based on comparison of the baseline test result and the new test result.

12. The system of claim 11, further comprising a data store to store at least one of the following:
   the baseline build, the new build, the baseline test result, the new test result, and the performance values.

13. The system of claim 11, further comprising a monitor engine to monitor the set of code changes and build a new code base based on the set of code changes received.

14. The system of claim 11, further comprising an analysis engine to perform at least one of the following:
   analyze the baseline test result and the new test result for at least one of a performance trend and a performance problem;
   correlate the performance value to a specific portion of the second code base; and
   generate a performance report to identify the performance values.

15. An apparatus useable with a continuous deployment pipeline, the apparatus comprising:
   a test device to perform a set of performance tests in the continuous deployment pipeline;
   a memory to store a set of instructions; and
   a processor coupled to the memory to execute the set of instructions to:
      identify a set of code changes between a baseline build and a new build, the baseline build and the new build being two distinct builds in a performance rest environment;
      obtain a baseline test result by executing a set of customized test scripts on the baseline build in the performance test environment, the baseline build including a first code base that the set of performance tests were successfully executed on in the continuous deployment pipeline;
      execute the set of customized test scripts on the new build in the performance test environment to obtain a new test result, the new build including a second code base being tested in the continuous deployment pipeline; and
      determine a performance value based on a comparison of the baseline test result and the new test result.

\* \* \* \* \*

UNITED STATES PATENT AND TRADEMARK OFFICE
CERTIFICATE OF CORRECTION

| | | |
|---|---|---|
| PATENT NO. | : 9,183,123 B2 | Page 1 of 1 |
| APPLICATION NO. | : 14/419019 | |
| DATED | : November 10, 2015 | |
| INVENTOR(S) | : Adam Spektor et al. | |

It is certified that error appears in the above-identified patent and that said Letters Patent is hereby corrected as shown below:

IN THE SPECIFICATION
In column 6, line 55, delete "of the of the" and insert -- of the --, therefor.

In column 6, line 58, delete "of the of the" and insert -- of the --, therefor.

IN THE CLAIMS
In column 12, line 18, in Claim 15, delete "rest" and insert -- test --, therefor.

Signed and Sealed this
Twenty-sixth Day of April, 2016

Michelle K. Lee
*Director of the United States Patent and Trademark Office*